E. RITSON.
Grain Drill.

No. 29,102.  Patented July 10, 1860.

Witnesses:  Inventor:

UNITED STATES PATENT OFFICE.

EDWIN RITSON, OF SANBORNTON BRIDGE, NEW HAMPSHIRE.

IMPROVEMENT IN SEEDING-MACHINES.

Specification forming part of Letters Patent No. 29,102, dated July 10, 1860.

*To all whom it may concern:*

Be it known that I, EDWIN RITSON, of Sanbornton Bridge, in the county of Belknap and State of New Hampshire, have invented a new and useful Improvement in Wheat Sowing, Harrowing, and Rolling Machines; and I do hereby declare that the following is a full, clear, and exact description thereof, reference being had to the accompanying drawings, making a part of this specification, in which—

Figure 1:
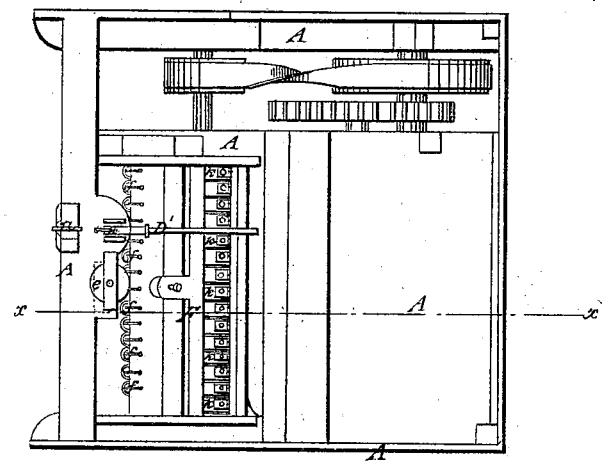
Figure 2:
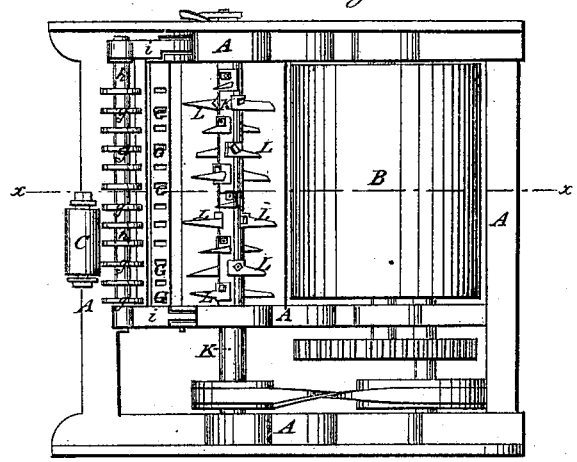
Figure 3:
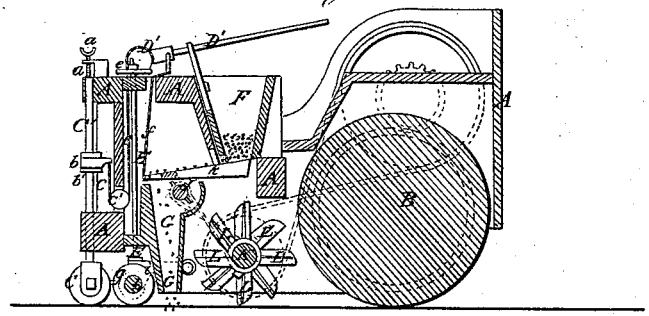

Figure 1 represents a plan view of the machine; Fig. 2, a bottom view of the same; Fig. 3, a longitudinal section taken through the vertical plane indicated by the red lines $xx$, Figs. 1 and 2.

Similar letters of reference indicate corresponding parts in the three figures.

The object of this invention is to combine in one and the same machine in a novel manner the operations of forming the furrow, sowing the seed, harrowing it in, and, lastly, rolling the earth so as to embed the seed into the soil and form a solid bed over it, so that it will not be liable to be affected by the frosts and subsequent thawing of the ground. The machine is intended for sowing wheat and to furnish every requirement in the operation of planting it.

To these ends my invention consists in combining in one machine in a novel manner the operations of forming ridges in the surface of the soil for receiving the wheat, sowing the wheat, and harrowing and rolling the same, all of which will be hereinafter described and represented.

To enable others skilled in the art to fully undestand my invention, I will proceed to describe its construction and operation.

The drawings represent a frame-work, A, mounted in its rear part on a large roller, B, and in its front part on a caster-wheel, C, having a very wide tread. This caster-wheel is on the end of a vertical shaft, C', which passes up loosely through suitable brackets and bears against an adjusting-screw, $a$, by which the movement of the forward end of the machine may be increased or diminished. $b$ is a loose collar, that rests on a shoulder, $b'$, on the shaft C', to which loose collar is attached a chain, $c$, that passes down under a pulley, $c'$, and is attached to a lever, D'. By this arrangement the driver, while sitting in his seat, may raise or depress the forward end of the machine.

Just in rear of the caster-wheel is arranged a gang of rotary pressing-wheels, $g$, all of which are on a shaft, $h$, that is hung from two jointed arms, $i$ $i$, and supported by a rod, E, that is furnished with an adjusting-wheel, $e$, by which the wheel-shaft, with its wheels $g$, may be raised or depressed, according to the depth it is desired to sink them into the ground to plant the seed. In rear of these wheels $g$ for opening shallow channels or furrows is arranged the seeding device, which consists of a hopper, F, inclined vibrating boards $k$, and seed-tubes G, Figs. 1 and 2, and a rotary shaft, J, from which project a number of pins, that give a vibrating or shaking motion to the boards $k$, so as to keep up a constant flow of seed from the hopper F to the tubes G, which conduct the seed down into the furrows made by the wheels $g$, above described. The boards $k$, in order that they should conduct the seed properly to the tubes, are hinged to the bottom of the hopper at one end and suspended by cords $f$ at the other end, as shown in Figs. 2 and 3.

Behind the seeding-tubes shown in Figs. 2 and 3 is arranged the harrow, which consists of a shaft, K, and teeth L L. The shaft has its bearings in the frame of the machine, and is driven by the large roller B through the medium of pulleys and gearing, as shown in Figs. 1 and 2. The teeth of the harrow are secured to the shaft in pairs radially to its axis by one bolt for each pair. The teeth are made with beveled surfaces, or surfaces in an oblique plane with the axis of the shaft, so that they will throw the earth to the right or left as the machine is drawn along and the harrow rotated very rapidly. The roller B then succeeds the harrow and presses the earth down compactly on the seed, and leaves it in a fit and safe state for vegetating.

The operation of this machine is as follows: The ground is first opened by the wheels $g$, that may be raised or depressed so as to make deep or shallow furrows, according to the character of the soil, by the hand-lever D, at the pleasure of the driver. Then follows the seed-tubes, and the seed is sown into the respective furrows made by the wheels $g$. The harrow then covers up the seed, and, lastly, the roller presses it in the earth, the entire operation being completed in once going over the ground.

Having thus described my invention, what I claim as new, and desire to secure by Letters Patent, is—

The combination of caster-wheel C, wheels g, and the seeding arrangement with the rotary harrow and roller B, all arranged relatively with each other to effect the objects in the manner herein set forth.

EDWIN RITSON.

Witnesses:
    ALEXANDER H. TILTON,
    ELEAZER DAVIS.